United States Patent [19]
Foster

[11] Patent Number: 5,961,153
[45] Date of Patent: Oct. 5, 1999

[54] EXHAUST REPAIR KIT FOR EXHAUST SYSTEM AND METHODS THEREFOR

[76] Inventor: David S. Foster, 148 Garden Dr., Bolingbrook, Ill. 60440-2616

[21] Appl. No.: 08/804,793

[22] Filed: Feb. 24, 1997

[51] Int. Cl.⁶ .................................................. F16L 55/00
[52] U.S. Cl. ............................... 285/15; 285/23; 285/31; 285/148.19; 285/148.25; 285/148.26; 285/368; 285/412; 285/1; 180/309
[58] Field of Search ............... 285/412, 31, 15, 285/148.19, 148.25, 148.26, 368, 424, 413; 29/890.08; 180/89.2, 296, 309

[56] References Cited

U.S. PATENT DOCUMENTS

| | | | |
|---|---|---|---|
| 986,506 | 3/1911 | Sargent | 285/412 X |
| 2,054,324 | 9/1936 | Hollerith | 285/148.26 X |
| 3,141,686 | 7/1964 | Smith et al. | 285/368 X |
| 4,415,188 | 11/1983 | Ginter, Jr. | |
| 4,522,282 | 6/1985 | Yamamoto | 285/368 X |
| 4,537,280 | 8/1985 | Roberts | 180/309 |
| 4,730,852 | 3/1988 | Arscott | |
| 4,822,075 | 4/1989 | Reaux | |
| 5,641,185 | 6/1997 | Harth | 285/412 X |
| 5,755,466 | 5/1998 | Harth | 285/412 |

OTHER PUBLICATIONS

J. C. Whitney Catalog No. 575C p180 May 1995 1917–19 Archa Ave. P.O. Box 8410 Chicago, IL–60680.

*Primary Examiner*—Dave W. Arola
*Attorney, Agent, or Firm*—Charles F. Meroni, Jr.

[57] ABSTRACT

An exhaust repair kit, including methods of manufacture and use thereof, in mounting a damaged pipe end to a flanged pipe end in a vehicle exhaust system comprising a length of tubing having a first portion and a second portion. The first portion being sized for engagement with the damaged pipe end. A replacement flange engages the second portion through a replacement flange aperture. The replacement flange aperture is of a sufficient diameter to allow the replacement flange to be freely movable axially and circumferentially about the second portion and enables the replacement flange to universally engage a variety of flanged pipe ends. Securing means for securing the first portion to the damaged pipe end. Locating means for locating the replacement flange about the second portion, said replacement flange being freely movable thereabout the second portion. And, fastening means for fastening the replacement flange to the flanged pipe end and thereby creating a closed exhaust system between the flanged pipe end and the damaged pipe end.

6 Claims, 5 Drawing Sheets

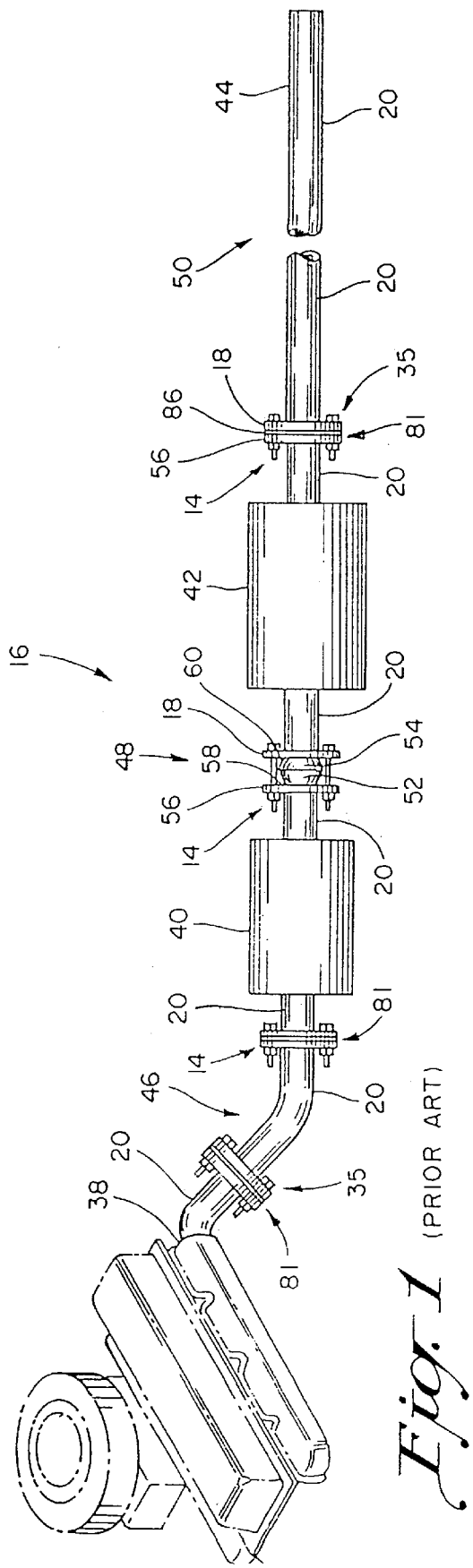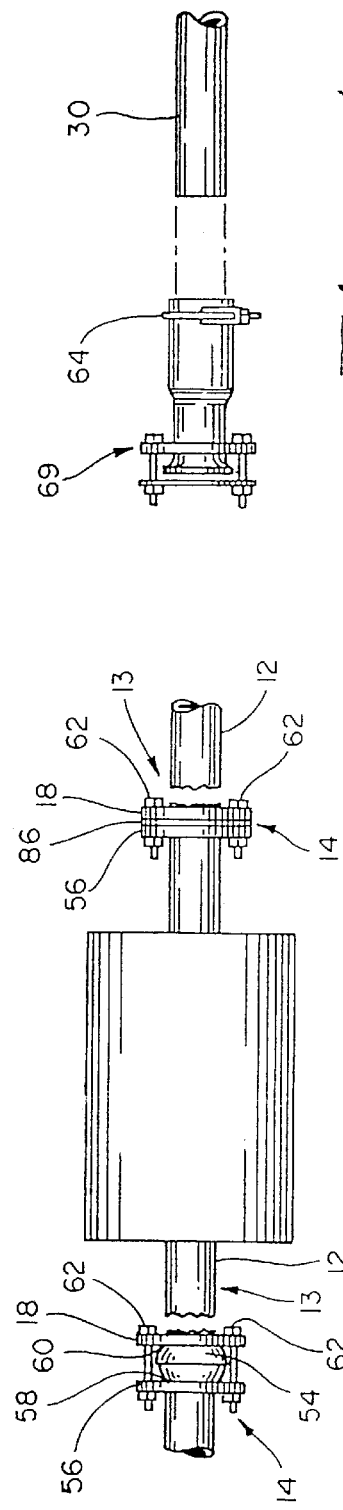
Fig. 1 (PRIOR ART)
Fig. 2
Fig. 4

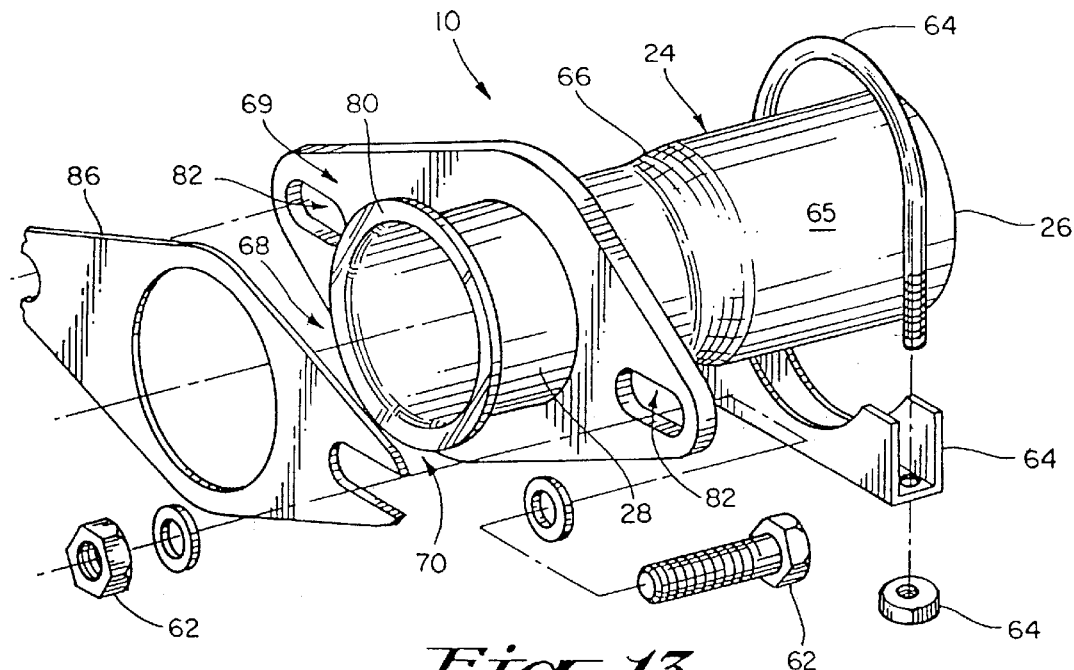
Fig. 13
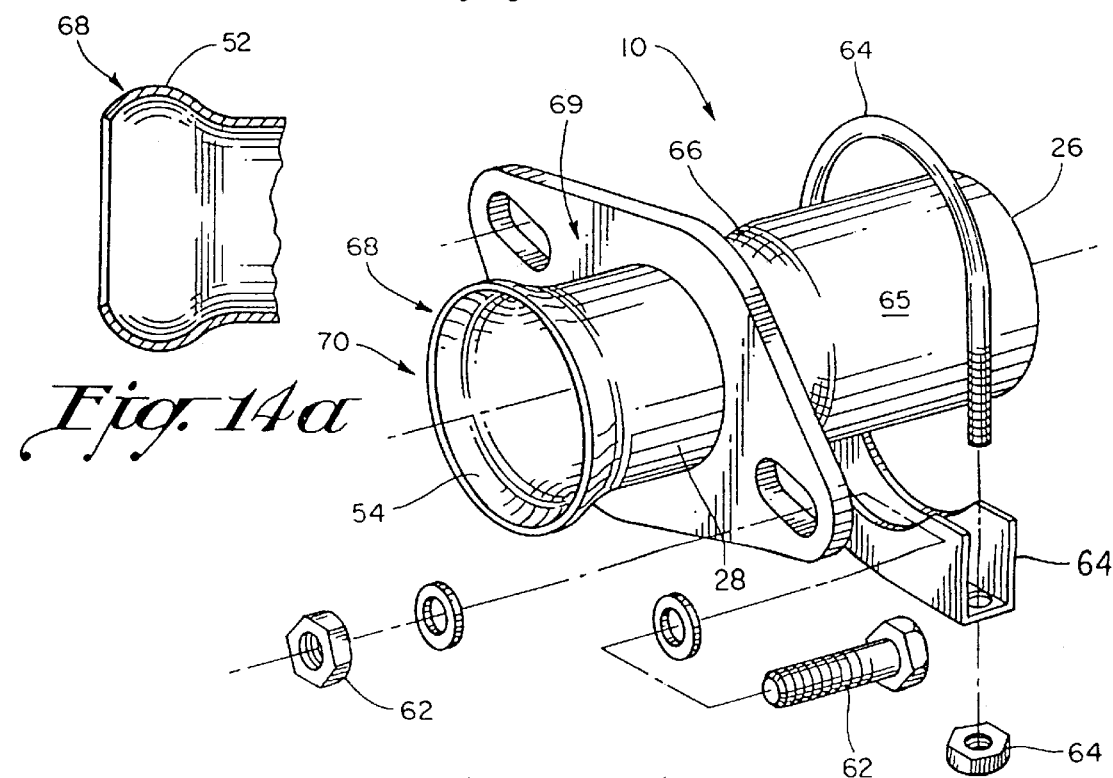
Fig. 14a
Fig. 14

EXHAUST REPAIR KIT FOR EXHAUST SYSTEM AND METHODS THEREFOR

BACKGROUND OF THE INVENTION

1. Field of the Invention

The present invention relates to an exhaust repair kit for use in repairing a motor vehicle's failed exhaust pipe system. More specifically, the exhaust repair kit is primarily intended for use to repair any number of original equipment failed exhaust pipe flange connections that commonly exist in the vehicle exhaust system's exhaust pipe that links and connects one or more of the components comprising an exhaust manifold, a catalytic converter, a muffler and a tailpipe. In practice, utilizing substantially all of the original equipment, the exhaust repair kit will enable a user to mount a damaged pipe end to a flanged pipe end in the vehicle exhaust system along the underside of a vehicle after corrosive failure of an original flange welded to an exhaust pipe end separates from the exhaust pipe end thereby creating an open vehicle exhaust system.

2. Description of the Prior Art

In the art of motor vehicle exhaust systems the original equipment supplied with a motor vehicle, as well as system component replacement parts, contain some type of flange exhaust pipe connection and often a welded flange pipe connection. Just as a chain is only as strong as its weakest length, so the test of time demonstrates that the exhaust system is only as strong as its weakest flange connection. Inherent in the operation of an exhaust system is subjecting the metal system to extreme temperatures and moisture over and over. Additionally, the flange connection points of the linkage system are subjected to extreme torsional and vibrational stress in the exhaust system. In operation, the temperatures, moisture and stress often result in one or more flange exhaust pipe connections failing long before its related component in the vehicle exhaust system does.

The usual remedy to such a failure has been to replace the whole component, starting a new with a costly component including the essential flange connections. In fact, the component may have years of use left in it and the only significant failure in the exhaust system occurred because of the failed flange connection. The only other remedy of which I am aware includes the use of a device like that shown in U.S. Pat. No. 4,415,188. Using this device one must remove both the failed exhaust pipe end and the related good flanged end to which the original flange (now having failed) was connected. Then, provided sufficient exhaust pipe exists and provided the pipe diameters correspond somehow, one could join the two flangeless pipe ends using the U.S. Pat. No. 4,415,188 patented device.

In practice, such remedies are overkill or less than adequate, if they even work. With my invention, one can avoid all of the short falls of the prior art devices at minimal cost with assured satisfactory performance and easy installation. These and other types of pipe repair devices disclosed in the prior art do not offer the flexibility and inventive features of my Exhaust Repair Kit for a vehicle Exhaust System. As will be described in greater detail hereinafter, the apparatus and methods relating to the present invention differ from those previously proposed.

SUMMARY OF THE INVENTION

According to my present invention I have provided 1, in combination, an exhaust repair kit for use in mounting a damaged pipe end to a flanged pipe end in a vehicle exhaust system along the underside of a vehicle after corrosive failure of an original flange connected to an exhaust pipe end separates from the exhaust pipe end thereby creating the damaged pipe end. The original flange and the flanged pipe end being connected by fastening means, the corrosive failure of the original flange enabling movement between the original flange and the damaged pipe end and thereby creating an open vehicle exhaust system. The exhaust repair kit comprising a length of tubing. The tubing having a first portion and a second portion. The first portion being sized for engagement about an outer circumference of the damaged pipe end. The second portion having an inside diameter not as great as an outside diameter of the damaged pipe end. Securing means for securing the first portion to the damaged pipe end. Locating means for locating a replacement flange about the second portion, said replacement flange has a replacement flange aperture through which the second portion engages the replacement flange. The replacement flange aperture is of sufficient diameter to allow the replacement flange to be freely movable thereabout the second portion between the locating means. Fastening means for fastening a replacement flange to the flanged pipe end and thereby creating a closed exhaust system between the flanged pipe end and the damaged pipe end.

According to other features in my invention I have provided the securing means comprising a U-bolt type assembly adapted to fasten about an outer circumference of the first portion such that the first portion of the tubing is tightly held against the damaged pipe end.

Another feature of my invention relates to the locating means comprising a raised collar and a lip structure. The raised collar being located between the first portion and the second. The lip located at an outer end of the second portion and the lip being matingly engageable with the replacement flange to thereby prevent the replacement flange from passing over the outer end.

Yet other features relate to the fastening means comprising at least two nut-and-bolt type fasteners, at least a first two holes in the replacement flange, at least a second two holes in the flanged pipe end, each of the first two holes corresponding to at least one of the second two holes in the flanged pipe end, each of the two nut-and-bolt type fasteners being operably engageable with one of the first two holes and corresponding second two holes and thereby enable the replacement flange to be securely fastened to the flanged pipe end.

Another feature of my invention relates to the at least first two holes in the replacement flange being slotted holes elongated in a direction pointing towards the center of the tubing.

Still another feature of my invention concerns the method of manufacturing an exhaust repair kit for use in mounting a damaged pipe end to a flanged pipe end in a vehicle exhaust system. The method comprising the steps of providing a length of tubing with an inside diameter not as great as an outside diameter of the damaged pipe end, the tubing having a first portion and a second portion; forming a lip structure at an outer end of the first portion of the tubing; engaging a replacement flange about the second portion of the tubing, the replacement flange having at least two holes therein; sizing the first portion of the tubing for engagement about an outer circumference of the damaged pipe end; attaching a U-bolt type assembly to the first portion of the tubing; and, attaching at least two nut-and-bolt type fasteners to the replacement flange.

Another feature of my invention relates to the process for using an exhaust repair kit in mounting a damaged pipe end to a flanged pipe end in a vehicle exhaust system along the underside of a vehicle after corrosive failure of an original flange welded to an exhaust pipe end separates from the exhaust pipe end thereby creating the damaged pipe end having a damaged part, the original flange and the flanged pipe end being connected by fastening means, the corrosive failure of the original flange enabling movement between the original flange and the damaged pipe end and thereby creating an open vehicle exhaust system. The exhaust repair kit including a first portion and a replacement flange, comprising the steps of: disconnecting the original flange from the flanged pipe end; removing the damaged part of the damaged pipe end; engaging the first portion of the exhaust repair kit with the damaged pipe end; securing the first portion to the damaged pipe end; fastening the replacement flange of the exhaust repair kit to the flanged pipe end and thereby creating a closed exhaust system between the flanged pipe end and the damaged pipe end; providing a gasket between the replacement flange and the flanged pipe end; and, bolting together the replacement flange and the flanged pipe end with at least two nut-and-bolt type fasteners.

DESCRIPTION OF THE DRAWINGS

Other features of my invention will become more evident from a consideration of the following detailed description of my patent drawings, as follows:

FIG. 1 is a side view of a prior art vehicle exhaust system;

FIG. 2 is an enlarged top view of a muffler component of the prior art vehicle exhaust system shown in FIG. 1, now with exhaust pipe failure of flange connections in front of and behind the muffler;

FIG. 4 is an enlarged top view of the damaged pipe end shown in FIG. 3, now with one embodiment of my exhaust repair kit about to engage the respective damaged pipe end;

FIG. 13 is an enlarged perspective view of my exhaust repair kit in accordance with important features of my invention;

FIG. 14 is an enlarged perspective view of another embodiment my exhaust repair kit in accordance with important features of my invention;

FIG. 14a is a partially enlarged side view of the lip structure of another embodiment my exhaust repair kit in accordance with important features of my invention;

DETAILED DESCRIPTION OF THE PREFERRED EMBODIMENT

Figure 5A:
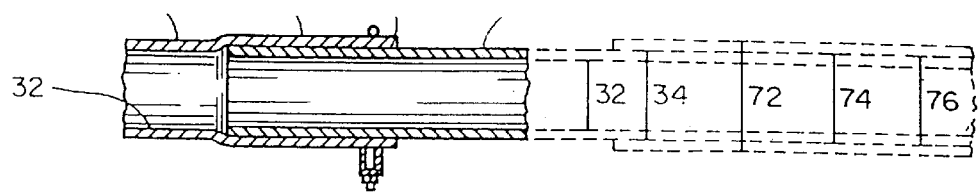
FIG. 5a is a enlarged cut away sectional view of a portion of the device shown in FIG. 5, here only including the right side of the figure showing one embodiment of my invention.
Figure 3:
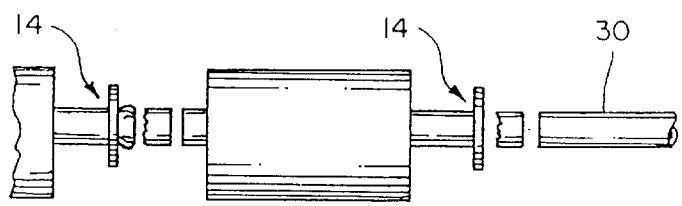
FIG. 3 is a top view of the muffler component shown in FIG. 1, now with the failed original flanges disconnected from respective flanged pipe ends and with damaged parts of respective damaged pipe ends removed from the pipe ends.
Figure 5:
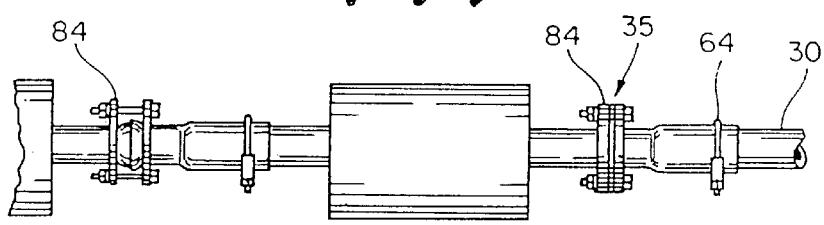
FIG. 5 is a top view of the muffler component shown in FIG. 3 along with the two embodiments of my exhaust repair kit shown in FIGS. 13 and 14, now with the exhaust repair kits full installed thereby again creating a closed exhaust system between the flanged pipe ends and the damaged pipe ends.
Figure 6:
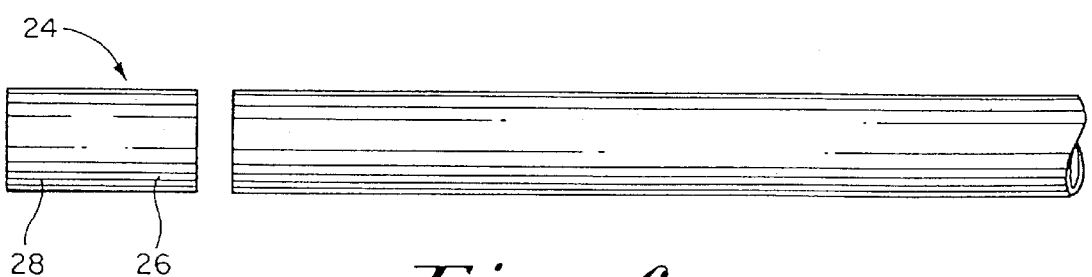
FIG. 6 is a side view of the first step in the manufacture of my exhaust repair kit shown in FIGS. 13 and 14.

Referring now to the drawings, FIG. 1 shows a typical prior art vehicle exhaust system 16 that is mounted along the underside of a vehicle. The system 16 includes the components of an exhaust manifold 38, a catalytic converter 40, a muffler 42, and a tailpipe 44. It should be understood that a system 16 need not include all of the components shown in FIG. 1, but that in a majority of the cases all of the components shown would exist in the system. Interconnecting these components are a first length of exhaust pipe 46 extending between the exhaust manifold and the catalytic converter, a second length of exhaust pipe 48 extending between the catalytic converter and the muffler, and a third length of exhaust pipe 50 extending between the muffler and the tail pipe.

The inter-connecting lengths of exhaust pipe are often joined by one of two prior art joint relationships. The first is referred to as flange to flange relationship, as shown at 81 in FIG. 1. In this relationship, the flanged pipe end 14 comprises the second flange 56 connected to an exhaust pipe end 20. This connection is often by way of the second flange being welded to the exhaust pipe 20. Other elements of this relationship include an original flange 18 connected to the exhaust pipe end 20. Again, this connection is often by way of the original flange being welded to the exhaust pipe 20. In operation before corrosive failure (and thereafter until repaired), the original flange and the second flange are matingly engaged with each other and fastened together with at least a pair of bolt type fasteners 62 extending between the second flange and the original flange. Additionally, placed in between the original and second flanges is often a gasket 86, to aid in providing a closed exhaust system between the original flange and the second flange, as shown at 35.

The second relationship for inter-connecting lengths of exhaust pipe comprises the connection of the flanged pipe end 14 and the original flange 18. The flanged pipe end includes a bulbous end 52 and the second flange 56 located adjacent a distant portion 58 of the bulbous end thereby defining the flanged pipe end for this second relationship. The original flange is located adjacent an opposite portion 60 of a mating cupped end 54. In operation before corrosive failure (and thereafter until repaired), the bulbous end 52 and the mating cupped end 54 are matingly engaged with each other and are sandwiched between the second flange and the original flange. Additionally, the original flange and the second flange are fastened together with at least the pair of bolt type fasteners 62 extending between the second flange and the original flange. In this relationship there is no need for a gasket to aid in providing a closed exhaust system between the original flange and the second flange.

Referring now to FIG. 2, some further elements of the vehicle exhaust system 16 may include, and which if included give rise to the need for my invention, are a damaged pipe end 12 and a damaged part 13. The damaged end 12 often results from corrosive failure of the original flange connected to the exhaust pipe. This failure develops slowly over time due to the corrosive forces of heat and water which operate to corrode the metal vehicle exhaust pipe, most often at a location adjacent to where the original flange is connected to the exhaust pipe. Upon complete corrosive failure, the original flange separates from the exhaust pipe end 20 forming the damaged pipe end. Further, the corrosive failure of the original flange thereby enables movement between the original flange and the damaged pipe end creating an open vehicle exhaust system 22, as shown in FIG. 2.

Turning now to FIGS. 13, 14 and 14a, one will see my new and improved exhaust repair kit 10. The kit comprises a length of tubing 24. The tubing has a first portion 26 and a second portion 28. The first portion is sized for engagement about an outer circumference 30 of the damaged pipe end 12. The second portion preferably has an inside diameter 32 not as great as an outside diameter 34 of the damaged pipe end (see FIG. 5a). In this way, the inside diameter 32 acts as a stop to aid a user installing my kit 10 to adequately assure the user that a sufficient length of the damaged pipe end is inserted into the first portion.

My kit 10 further includes a U-bolt type assembly 64 adapted to fasten about an outer circumference 65 of the first portion for securing the first portion to the damaged pipe end. It should be understood that other embodiments of assembly 64 could be employed and remain within the scope of my disclosed and claimed invention, as long as the first portion is secured to the damaged pipe end. The assembly 64 is further understood to enable the first portion of the tubing to be tightly held against the damaged pipe end.

Next, my kit includes a raised collar 66 and a lip structure 68 for locating a replacement flange 69 about the second portion. The replacement flange has a replacement aperture 69a through which the second portion engages the replacement flange. The replacement flange aperture is of sufficient diameter to allow the replacement flange to be freely movable horizontally and axially about the second portion between the raised collar and lip structure. In this way, avoiding a welded connection reduces manufacturing time and costs and further enables universality of my kit 10. Excellent results are obtained when the lip structure is located at an outer end 70 of the second portion and comprises a continuous annular lip matingly engageable with the replacement flange to thereby prevent the replacement flange from passing over the outer end. However, it should be understood that the lip structure need not be a continuous annular lip nor matingly enageable with the replacement flange as long as the lip structure prevents the replacement flange from passing over the outer end.

Further excellent results are obtained when the raised collar comprises the first portion having an outside diameter 72 greater than an outside diameter 74 of the second portion. Additionally, my preferred embodiment includes the raised collar further comprising the first portion having an inside diameter 76 greater than the inside diameter 32 of the second portion. In this way, as will be explained in detail concerning the manufacturing of my invention, providing the collar through the relationship of the inside and outside diameters of the first and second portions reduces manufacturing time and resources.

The various embodiments of my kit 10 are adapted to replace either of the two prior art joint relationships heretofore discussed, once corrosive failure affects the vehicle exhaust system. This versatility is possible where the lip structure 68 comprises a member from the group consisting of the bulbous end 52 (shown in FIG. 14a), the mating cupped end 54 (shown in FIG. 14), and a flat end 80 (shown in FIG. 13), as required. In operation, (as explained further hereafter) the original flange will be disconnected from the flanged pipe end and then a kit 10 having the appropriate lip structure will be installed in the vehicle exhaust system to be matingly fastened to the flanged pipe end, the second flange being either unaffected by corrosive failure or having already been replaced by a previous installation of my kit 10. In this way the kit 10 is located along a member from the group consisting of the first length of exhaust pipe, the second length of exhaust pipe and the third length of exhaust pipe, as needed. Also, concerning two embodiments of my kit 10, once installed, the kit will be located adjacent a member from the group consisting of the bulbous end and the mating cupped end, which is usually the case when corrosive failure affects the second length of exhaust pipe.

The final key element of my kit 10 comprises at least two nut-and-bolt type fasteners 62 or the like, at least a first two holes 82 in the replacement flange and at least a second two holes 84 in the flanged pipe end. Each of the first two holes will correspond to at least one of the second two holes in the flanged pipe end. Then, each of the two nut-and-bolt type fasteners are operably engageable with one of the first two holes and corresponding second two holes to thereby enable the replacement flange to be securely fastened to the flanged pipe end. In one embodiment of my invention which includes the flat end 80, excellent results are obtained when a gasket 86 is mounted between the flanged pipe end 14 and the replacement flange 69.

Figure 15:
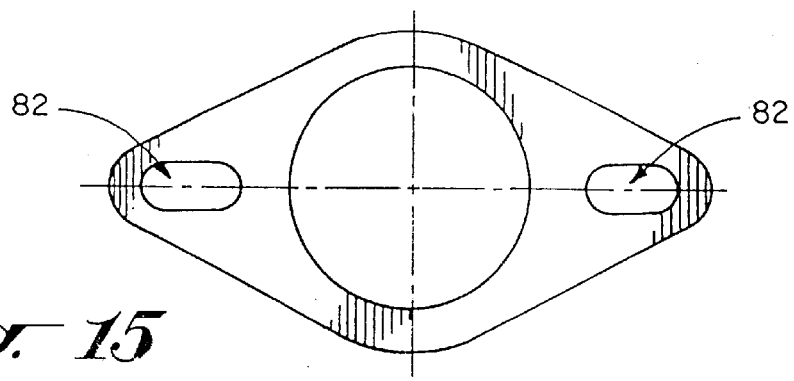
FIG. 15 is a front view of one embodiment of a replacement flange of my exhaust repair kit in accordance with important features of my invention.
Figure 16:
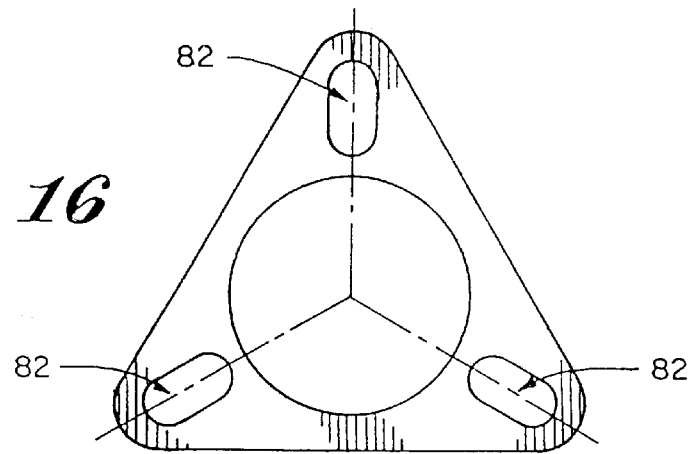
FIG. 16 is a front view of another embodiment of a replacement flange of my exhaust repair kit in accordance with important features of my invention; and, FIG. 17 is a front view of yet another embodiment of a replacement flange of my exhaust repair kit in accordance with important features of my invention.
Figure 17:
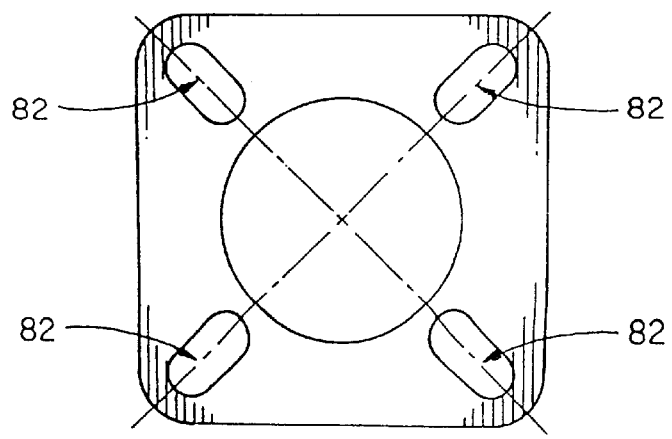

Additional universal adaptability and advantages for my invention are obtained when the at least first two holes in the replacement flange are slotted holes elongated in a direction pointing towards the center of the tubing, as shown in FIGS. 13, 14, 15, 16 and 17. Further concerning the configuration of the replacement flange, a diamond shaped replacement flange, as shown in FIG. 15, is the preferred configuration to enable my kit 10 to repair a majority of failed vehicle exhaust systems while also reducing manufacturing materials and costs. However, this configuration is only preferred if it is operable with the vehicle system that one desires to repair. Alternative embodiments of my replacement flange are shown in FIGS. 16 and 17.

A preferred method of manufacturing my exhaust repair kit 10 for use in mounting a damaged pipe end to a flanged pipe end in a vehicle exhaust system is shown generally in FIGS. 6 through 12 inclusive. It should be noted that these figures explicitly show each step for one embodiment of my invention, namely the one that includes a flat end 80, and that some of the steps are shown for the other embodiments where it is understood that any step not explicitly shown is so related to the respective step explicitly shown for the one embodiment and that one skilled in the art could readily understand how to perform each step. Additionally, it should be understood that the order of the steps recited here are preferred for the practice of manufacturing my invention, however, they could be interchanged and remain within the scope of my invention here, should other considerations dictate a different order of steps.

The method comprises a first step (FIG. 6) of providing a length of tubing 24 having a first portion 26 and a second portion 28. Excellent results are obtained when the length of tubing is six inches, although it is understood that other lengths are possible. Additionally, excellent results are obtained when the tubing has an inside diameter 32 is not as great as an outside diameter 34 of the damaged pipe end (see FIG. 5a).

A second step (FIGS. 7 and 8) is to form a lip structure 68 at an outer end 70 of the second portion of the tubing. This step is preferably accomplished by use of a sweger. In particular, use of the Bend-Pak (TM) Incorporated sweger known as the "1302", or a higher model number which represents an improved type of machine. In operation, the tubing is placed into the sweger and the outer end 70 is sweged to form the lip structure 68.

A third step (FIG. 9) comprises engaging a replacement flange 69 about the second portion 28 of the tubing, the replacement flange having at least two holes therethrough. One way to perform this step is by passing the flange 69 over the first portion and into engagement with the second portion.

Next, a fourth step (FIG. 10) comprises the first portion 26 of the tubing 24 being sized for engagement about an outer circumference 30 of the damaged pipe end. One known way to accomplish this step is by use of a sweger. In particular, use of the Bend-Pak (TM) Incorporated sweger known as the "1302", or a higher model number which represents an improved type of machine. In operation, the tubing, including the replacement flange, is placed into the sweger and the first portion is expanded to a desired size for engagement about an outer circumference 30 of the damaged pipe end. Excellent results are obtained when the step of sizing comprises expanding the first portion to have an outside diameter greater than an outside diameter of the second portion and an inside diameter greater than the inside diameter of the second portion.

Figure 10A:
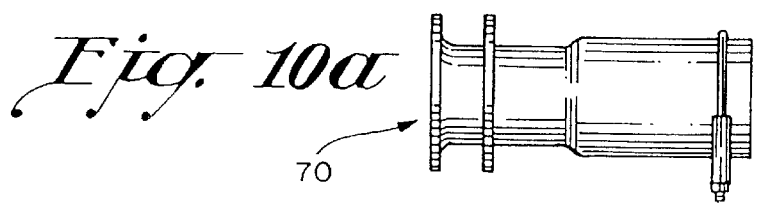
FIG. 10a is a side view of a fifth step in the manufacture of my exhaust repair kit shown in FIG. 13.
Figure 7:
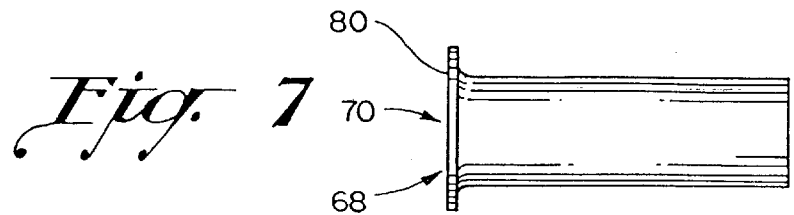
FIG. 7 is a side view of a second step in the manufacture of my exhaust repair kit shown on FIG. 13.
Figure 8:
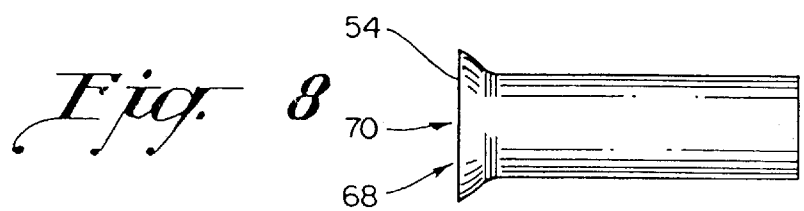
FIG. 8 is a side view of a second step in the manufacture of my exhaust repair kit shown on FIG. 14.
Figure 9:
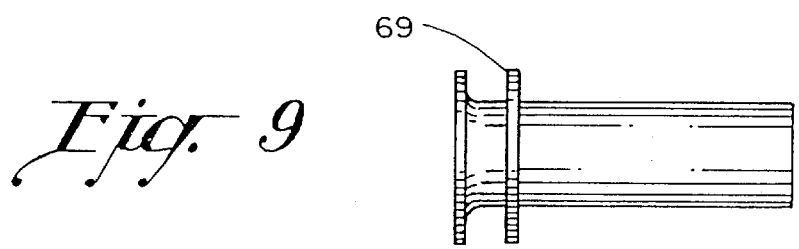
FIG. 9 is a side view of a third step in the manufacture of my exhaust repair kit shown in FIG. 13.
Figure 10:
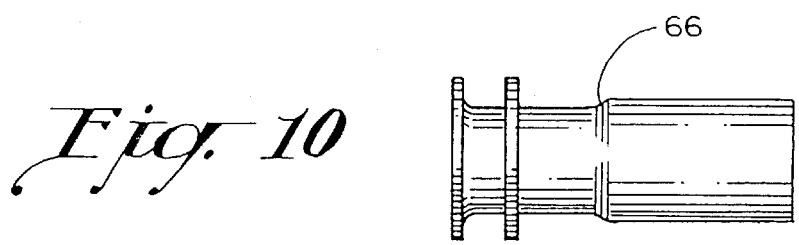
FIG. 10 is a side view of a fourth step in the manufacture of my exhaust repair kit shown in FIG. 13.
Figure 11:
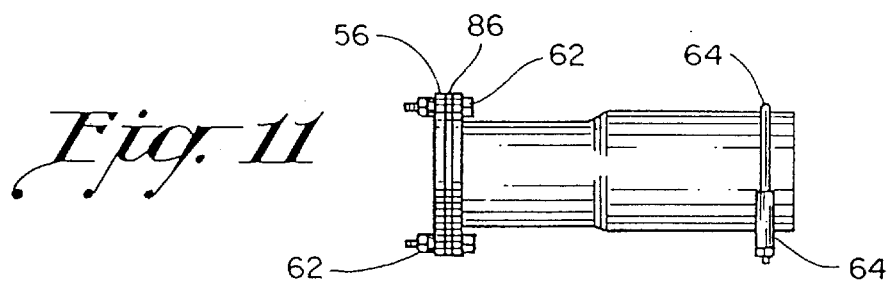
FIG. 11 is a top view of a sixth step in the manufacture of my exhaust repair kit shown in FIG. 13.
Figure 12:
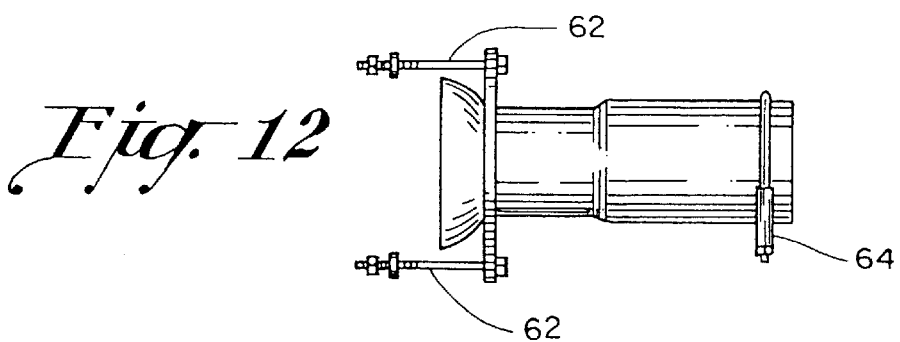
FIG. 12 is a top view of a sixth step in the manufacture of my exhaust repair kit shown in FIG. 14.

A fifth step (FIG. 10a) to manufacture my invention includes attaching a U-bolt type assembly to the first portion of the tubing, by any of several known ways in the prior art.

A finally step (11 and 12), if desired, includes the step of attaching at least two nut-and-bolt type fasteners to the replacement flange. In this way the kit 10 is a complete unit conveniently and compactly assembled for sale and then use by a consumer. In one embodiment of my invention, namely, the one including the flat end 80, the method of manufacture further comprises the steps of placing a gasket against the outer end and then attaching at least two nut-and-bolt type fasteners to the gasket and the replacement flange, thereby sandwiching the outer end between the replacement flange and the gasket.

Turning now to FIGS. 2 through 5a inclusive, one will understand the process for using my exhaust repair kit 10 in mounting a damaged pipe end to a flanged pipe end in a vehicle exhaust system along the underside of a vehicle. It should be understood that the order of the steps recited here are preferred for the practice of using my invention, however, they could be interchanged and remain within the scope of my invention here, should other considerations dictate a different order of steps. Additionally, it should be noted that these figures explicitly show each step for one embodiment of my invention, namely the one that includes a flat end 80, and that some of the steps are shown for the other embodiments where it is understood that any step not explicitly shown is so related to the respective step explicitly shown for the one embodiment and that one skilled in the art could readily understand how to perform each step.

A first step (FIG. 3) is to disconnect the original flange from the flanged pipe end, using any of a number of ways know in the art. Next (FIG. 3), one should remove the damaged part 13 of the damaged pipe end. Excellent results are obtained when the step of removing comprises cutting off the damaged part of the damaged pipe end.

A second step (FIG. 4) is engaging the first portion of the exhaust repair kit with the damaged pipe end. This is accomplished by sliding the first portion over the damaged pipe end 12 up until the raised collar is adjacent to the damaged pipe end.

A third step (FIG. 5) includes securing the first portion to the damaged pipe end. In particular this is preferably achieved by the U-bolt type assembly adapted to fasten about the outer circumference of the first portion such that the first portion of the tubing is tightly held about the damaged pipe end.

A fourth step (FIG. 5) comprises fastening the replacement flange of the exhaust repair kit to the flanged pipe end and thereby creating a closed exhaust system between the flanged pipe end and the damaged pipe end. In operation, this is accomplished by bolting together the replacement flange and the flanged pipe end with at least two nut-and-bolt type fasteners. In an alternative embodiment of my invention, namely when the flat end 80 is employed, an additional step includes first providing a gasket between the replacement flange and the flanged pipe end and then bolting together the replacement flange and the flanged pipe end.

As various possible embodiments may be made in the above invention for use for different purposes and as various changes might be made in the embodiments and methods above set forth, it is understood that all of the above matters here set forth or shown in the accompanying drawings are to be interpreted as illustrative and not in a limiting sense.

I claim:

1. An exhaust repair kit for use in mounting a damaged pipe end to a flanged end in a vehicle exhaust system comprising:

a length of tubing having a first portion and a second portion, the first portion being sized for telescoping engagement with the damaged pipe end and having an outside diameter greater than the second portion, the second portion having a lip structure on an outer end and a raised collar connecting the second portion to the first portion;

securing means for securing the first portion to the damaged pipe end;

a replacement flange, the replacement flange located on the second portion of the tubing by the raised collar and the lip structure of the second portion, the replacement flange having a replacement flange aperture, the replacement flange engaging the second portion through the replacement flange aperture, the replacement flange aperture being of sufficient diameter to allow the replacement flange to be freely movable axially and circumferentially about the second portion and said aperture being smaller than the outer diameter of the raised collar and lip structure enabling the replacement flange to universally engage a variety of flanged pipe ends; and fastening means for fastening the replacement flange to the flange pipe end and thereby creating a closed exhaust system between the flanged pipe end and the damaged pipe end.

2. The exhaust repair kit of claim 1, wherein the raised collar further comprises the first portion having an inside diameter greater than the inside diameter of the second portion.

3. The exhaust repair kit of claim 1, wherein the fastening means comprises at least two nut-and-bolt type fasteners, at least a first two holes in the replacement flange, at least two holes in the flanged pipe end, each of the first two holes corresponding to at least one of the second two holes in the flanged pipe end, each of the two nut-and-bolt type fasteners being operably engageable with one of the first two holes and corresponding second two holes and thereby enable the replacement flange to be securely fastened to a flanged pipe end.

4. The exhaust repair kit of claim 3, wherein the at least first two holes in the replacement flange are slotted holes elongated in a direction pointing towards the center of the tubing.

5. An exhaust repair kit for using in mounting a damaged pipe end to a flanged pipe end in a vehicle exhaust system comprising:

a length of tubing having a first portion and a second portion, the first portion being sized for telescoping engagement with the damaged pipe end and having an outside diameter greater than the second portion, the second portion having a lip structure on an outer end and a raised collar connecting the second portion to the first portion;

securing means for securing the first portion to the damaged pipe end;

a replacement flange, the replacement flange located on the second portion of the tubing by the raised collar and the lip structure of the second portion, the replacement flange having a replacement flange aperture and a first two holes, the first two holes corresponding to a second two holes in the flanged pipe end, the replacement flange engaging the second portion through the replacement flange aperture, the replacement flange aperture being of sufficient diameter to allow the replacement flange to be freely movable axially and circumferentially about the second portion and said aperture being smaller than the outer diameter of the raised collar and lip structure enabling the replacement flange to universally engage a variety of flanged pipe ends; and a plurality of nut-and-bolt type fasteners being operably engageable with the first two holes on the replacement flange and the corresponding second two holes on the flanged pipe end enabling the replacement flange to be securely fastened to the flanged pipe end.

6. An exhaust repair kit for use in mounting a damaged pipe end in a vehicle exhaust system comprising:

a length of tubing having a first portion and a second portion, the first portion being sized for telescoping engagement with the damaged pipe end and having an outside diameter greater than the second portion, the second portion having a lip structure on an outer end and a raised collar connecting the second portion to the first portion;

a U-bolt type assembly adapted to fasten the first portion to the damaged pipe end such that the first portion of the tubing is tightly held together with the damaged pipe end;

a replacement flange, the replacement flange located on the second portion of the tubing by the raised collar and the lip structure of the second portion, the replacement flange having a replacement flange aperture and a first two holes, the first two holes corresponding to a second two holes in the flanged pipe end, the replacement flange engaging the second portion through the replacement flange aperture, the replacement flange aperture being of sufficient diameter to allow the replacement flange to be freely movable axially and circumferentially about the second portion and said aperture being smaller than the outer diameter of the raised collar and lip structure enabling the replacement flange to universally engage a variety of flanged pipe ends; and a plurality of nut-and-bolt type fasteners being operably engageable with the first two holes on the replacement flange and the corresponding second two holes on the flanged pipe and enabling the replacement flange to be securely fastened to the flanged pipe end.

* * * * *